United States Patent
Plewicki et al.

(10) Patent No.: US 12,007,329 B2
(45) Date of Patent: Jun. 11, 2024

(54) SYSTEM INCLUDING A FIBER LASER MODULE

(71) Applicant: ATONARP INC., Tokyo (JP)

(72) Inventors: Mateusz Plewicki, Fremont, CA (US); Neil Ou, Fremont, CA (US)

(73) Assignee: ATONARP INC., Tokyo (JP)

( * ) Notice: Subject to any disclaimer, the term of this patent is extended or adjusted under 35 U.S.C. 154(b) by 0 days.

(21) Appl. No.: 18/356,675

(22) Filed: Jul. 21, 2023

(65) Prior Publication Data
US 2024/0094131 A1 Mar. 21, 2024

Related U.S. Application Data

(63) Continuation of application No. 18/000,715, filed as application No. PCT/JP2021/033384 on Sep. 10, 2021, now Pat. No. 11,747,282.

(60) Provisional application No. 63/077,124, filed on Sep. 11, 2020.

(51) Int. Cl.
*G01J 3/44* (2006.01)
*G01N 21/65* (2006.01)

(52) U.S. Cl.
CPC ....... *G01N 21/65* (2013.01); *G01N 2021/653* (2013.01); *G01N 2201/06113* (2013.01)

(58) Field of Classification Search
CPC ............ G01N 21/65; G01N 2021/653; G01N 2201/06113; G01J 3/44; A61B 5/0075
See application file for complete search history.

(56) References Cited

U.S. PATENT DOCUMENTS

| | | | |
|---|---|---|---|
| 7,821,633 B2 | 10/2010 | Jalali et al. | |
| 9,595,802 B2 | 3/2017 | Fermann et al. | |
| 2014/0285873 A1 | 9/2014 | Kieu et al. | |
| 2016/0047750 A1 | 2/2016 | Berto et al. | |
| 2016/0238532 A1 | 8/2016 | Freudiger et al. | |
| 2017/0023482 A1 | 1/2017 | Cicerone et al. | |
| 2019/0101419 A1* | 4/2019 | Rowen | H01S 3/302 |
| 2020/0203911 A1 | 6/2020 | Popa et al. | |

(Continued)

FOREIGN PATENT DOCUMENTS

| | | |
|---|---|---|
| EP | 2982947 A1 | 2/2016 |
| WO | 2014061147 A1 | 4/2014 |

OTHER PUBLICATIONS

Baudisch et al., "High power multi-color OPCPA source with simultaneous femtosecond deep-UV to mid-IR outputs", Optics Letters, Aug. 1, 2016, pp. 3583-3586, vol. 41, No. 15, Optical Society of America. (4 pages).

(Continued)

*Primary Examiner* — Abdullahi Nur
(74) *Attorney, Agent, or Firm* — BUCHANAN INGERSOLL & ROONEY PC

(57) ABSTRACT

A system includes an optical module for supplying a Stokes light, a pump light and a probe light for generating a CARS light. The optical module includes a fiber laser module and an optical plate. The fiber laser module includes an oscillator, a generator, a first amplifier, a second amplifier and a LD power distributor that is configured to distribute a laser power from a first laser diode to the oscillator as an oscillation source, to the generator as a pump power, to the first preamplifier as a pump power and to the second preamplifier as a pump power.

10 Claims, 6 Drawing Sheets

(56) References Cited

U.S. PATENT DOCUMENTS

2020/0358243 A1* 11/2020 Kusaka .................. H01S 3/302

OTHER PUBLICATIONS

International Search Report (PCT/ISA/210) and Written Opinion (PCT/ISA/237) dated Nov. 30, 2021, by the Japanese Patent Office as the International Searching Authority for International Application No. PCT/JP2021/033384. (7 pages).

* cited by examiner

[Fig. 1]
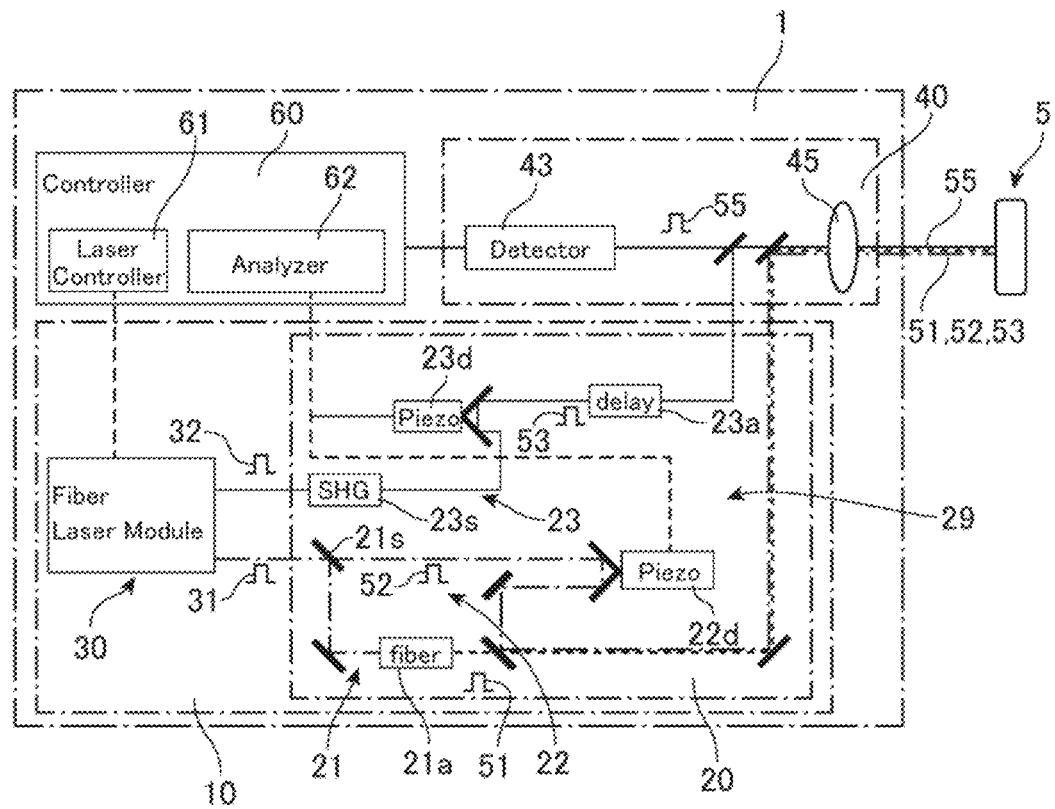
[Fig. 2]
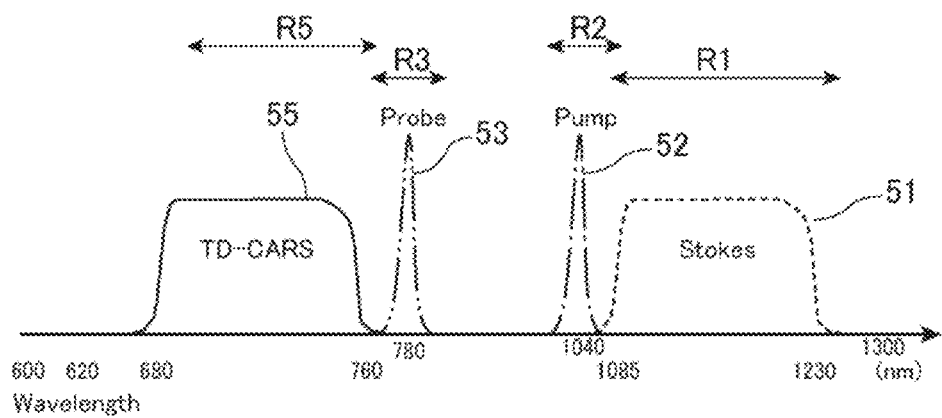

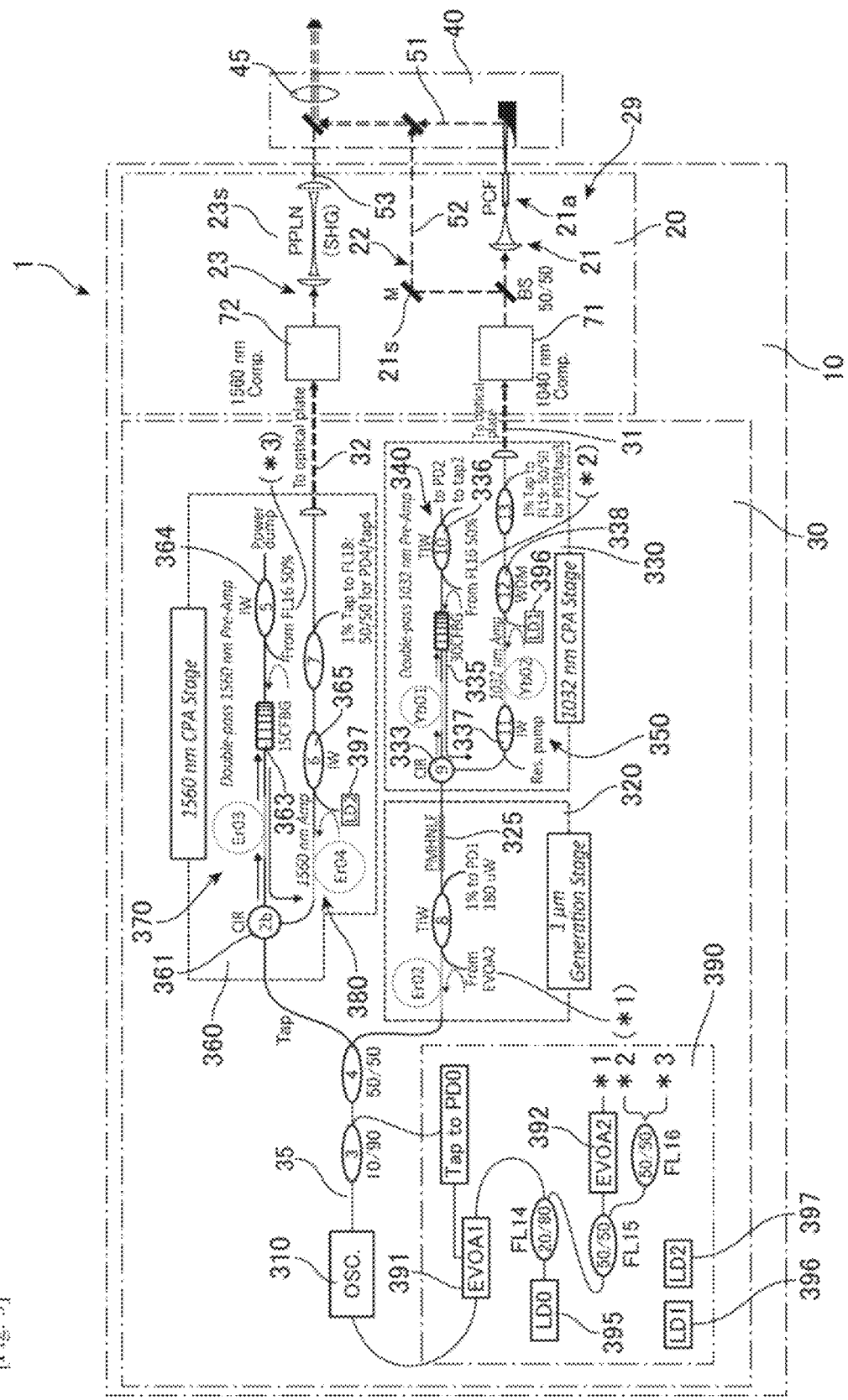
[Fig. 3]

[Fig. 4]
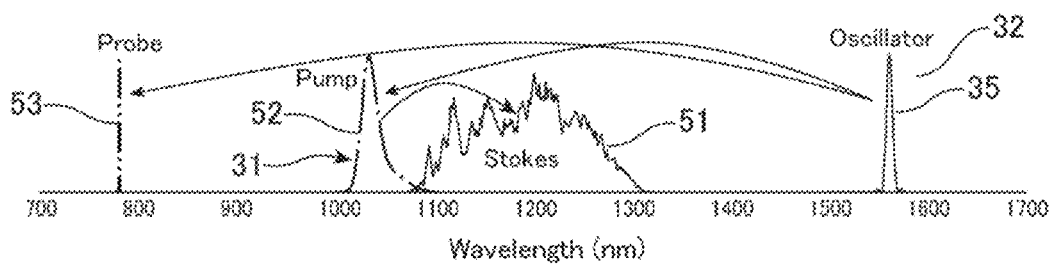
[Fig. 5]
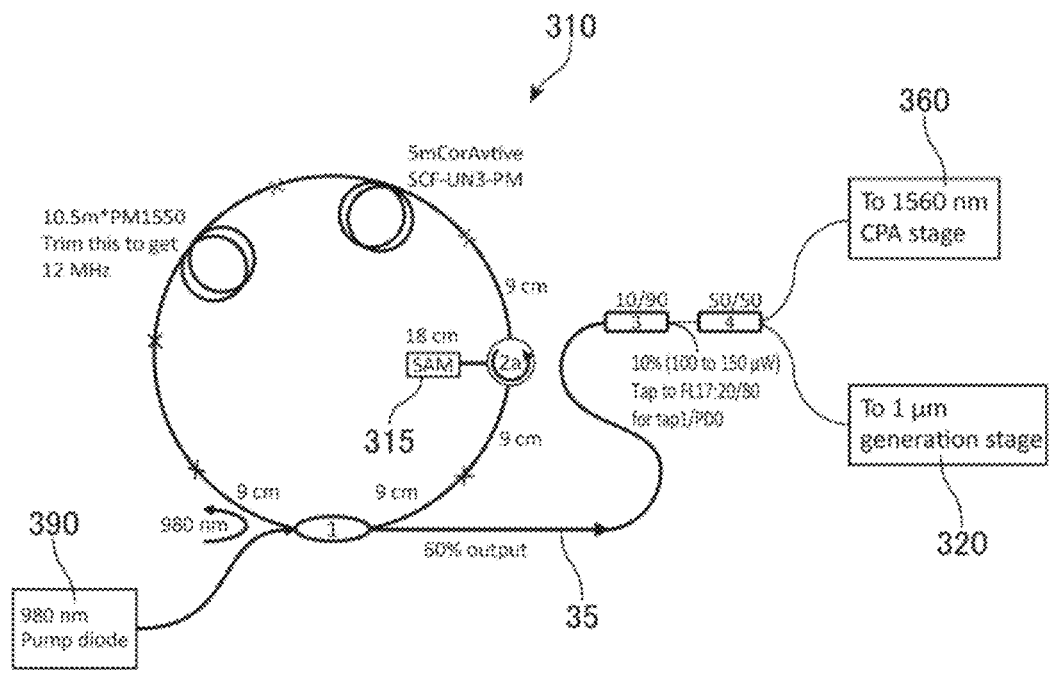

[Fig. 8]
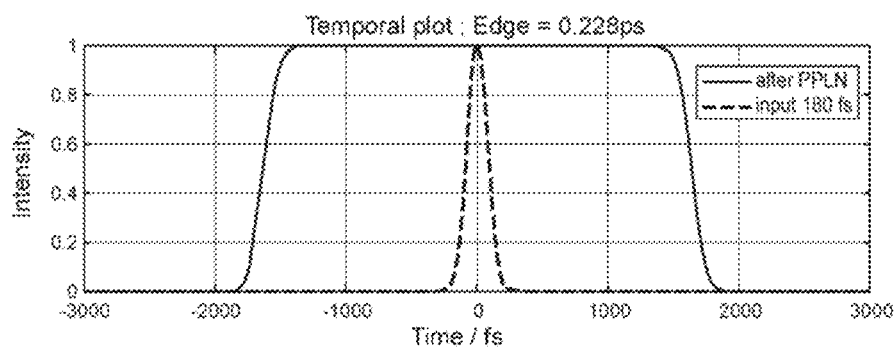
[Fig. 9]
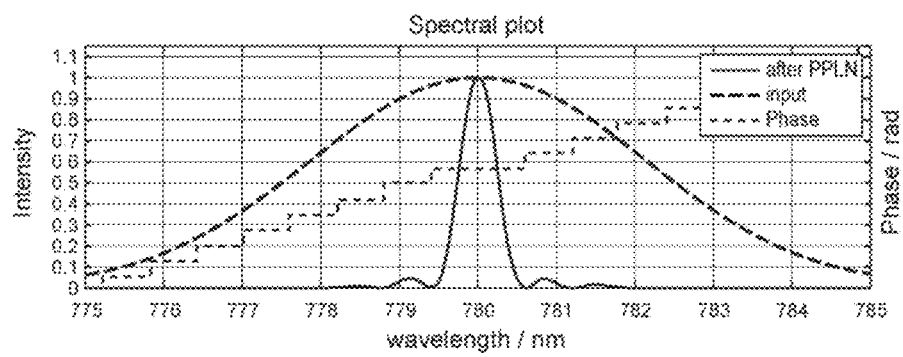

SYSTEM INCLUDING A FIBER LASER MODULE

CROSS REFERENCE TO RELATED APPLICATIONS

The present application is a continuation of U.S. application Ser. No. 18/000,715, filed Dec. 5, 2022, and which is a national stage application of PCT/JP2021/033384, filed on Sep. 10, 2021, and which claims the priority of U.S. Provisional patent application No. 63/077,124, filed on Sep. 11, 2020. The contents of U.S. application Ser. No. 18/000,715; PCT/JP2021/033384; and U.S. Provisional patent application No. 63/077,124 are all incorporated herein by reference.

TECHNICAL FIELD

The invention generally relates to a system that includes a fiber laser module.

BACKGROUND ART

In a publication WO2014/061147, a microscope is disclosed. The microscope includes: a first light dividing part that divides a light flux of light from a light source into a first pump light flux and a second pump light flux; a Stokes light source that receives the second pump light flux as an input and outputs a Stokes light flux: a multiplexing part that multiplexes the first pump light flux and the Stokes light flux to generate a multiplexed light flux; a first light-collecting part that collects the multiplexed light flux in a sample; a first detector that detects CARS light generated from the sample, the CARS light having a wavelength different from the multiplexed light flux; a second light dividing part that lets at least one of the second pump light flux and the Stokes light flux branch partially as a reference light flux; a second multiplexing part that multiplexes a light flux from the sample and the reference light flux to generate interfering light; and a second detector that detects the interfering light.

SUMMARY OF INVENTION

One of aspects of this invention is a system comprising an optical module for supplying a Stokes light, a pump light and a probe light for generating a CARS (Coherent Anti-Stokes Raman Scattering, Coherent Anti-Stokes Raman Spectroscopy) light. The optical module includes: a fiber laser module for suppling a first light source for converting to the Stokes light and the pump light, and a second light source for converting to the probe light; and an optical plate that includes a plurality of optical element for converting the first light source to the Stokes light and the pump light, and the second light source to the probe light. The fiber laser module includes: (i) an oscillator that is configured to output a base laser with mode-locked to be split for generation of the first light source and the second light source; (ii) a generator that is configured to generate the first light source by stretching wavelength range of the base laser; (iii) a first amplifier that includes a first preamplifier and a first Chirped Pulse Amplification (CPA) unit for the first light source; (iv) a second amplifier that includes a second preamplifier and a second CPA unit for the second light source; and (v) a LD power distributor that is configured to distribute a laser power from a first laser diode to the oscillator as an oscillation source, to the generator as a pump power, to the first preamplifier as a pump power and to the second preamplifier as a pump power.

In the system of this invention, by providing the preamplifier for each amplifier for the source light and the LD poser distributer for distributing the leaser power from the common laser diode to each preamplifier in addition to the oscillator and the generator, not only reducing the LD quantity, but also the laser diode (common LD) can be running at its operational level, which may be 90% to 100% of the LD's designed output power level. When a LD operates in this region, the intensity noise from the LD is usually the minimum. Therefore, stable and precisely controlled or tuned base laser can be obtained from the oscillator, which can then be used to generate stable and precisely controlled or tuned source lights for the Stokes light, pump light and probe light. In one embodiment, these two pulses (the first light source (first source light, first source pulses) and the second light source (second source light, second source pulses)) from different output arms of the fiber laser module are synchronous in time within 50 ps.

BRIEF DESCRIPTION OF DRAWINGS

The embodiments herein will be better understood from the following detailed description with reference to the drawings, in which:

FIG. 1 depicts an embodiment of a system of this invention;

FIG. 2 depicts a wavelength plan of the system;

FIG. 3 depicts a block diagram of an optical module;

FIG. 4 depicts a wavelength plan of a fiber laser module;

FIG. 5 depicts a block diagram of an oscillator;

FIG. 8 depicts a temporal plot of a probe pulse;

FIG. 9 depicts a spectral plot of the probe pulse.

DESCRIPTION OF EMBODIMENTS

Figure 6:
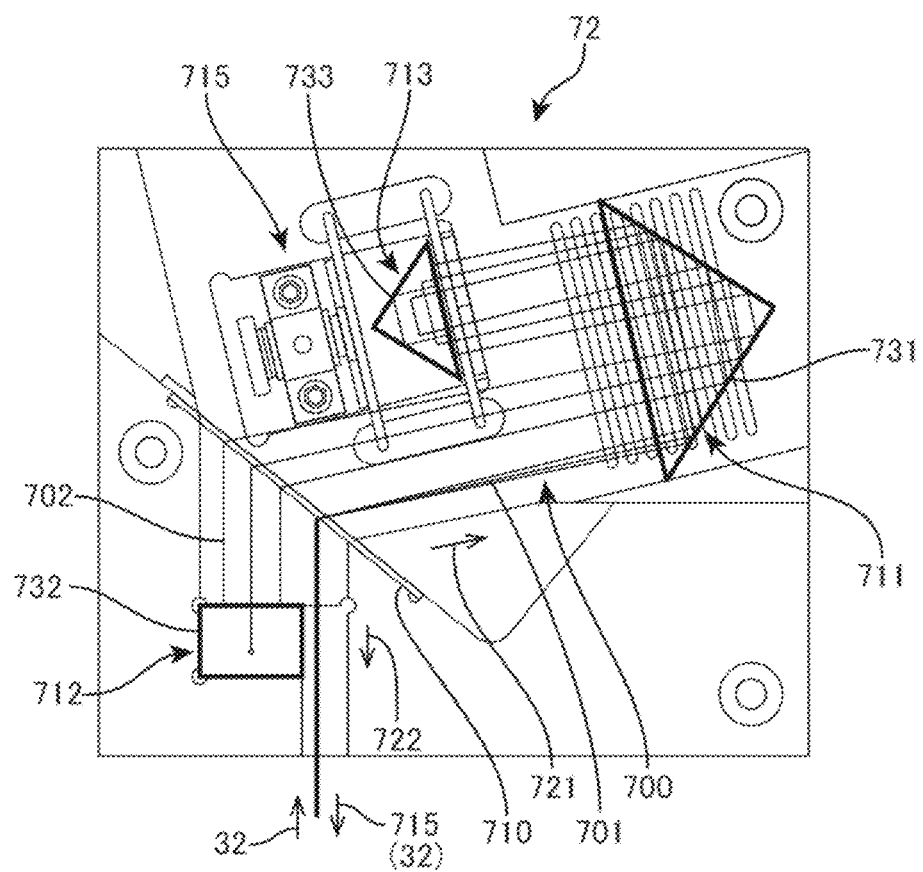
FIG. 6 depicts a plan view of a compressor.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

There are many terminologies used in fiber laser and nonlinear optics will be shown in this specification and the abbreviation of it will be used. The following list is the abbreviations used in this specification:

FL Fiber Laser
OSC Oscillator
LD Laser diode
PD Photodiode
EVOA Electronically Controlled Variable Optical Attenuator
SAM Saturable Absorber Mirror
FC/APC Ferrule Connecter/Angled physical Contact
Er Erbium
EDFA Erbium Doped Fiber Amplifier
Yb Ytterbium
YDFA Ytterbium Doped Fiber Amplifier
SMF Single Mode Fiber PM Polarization Maintaining
HNLF Highly Nonlinear Fiber
PCF Photonic Crystal Fiber
WDM Wavelength Division Multiplexing
CIR Optical Circulator
SC Supercontinuum
SHG Second Harmonic Generation
FWHM Full Width Half Maximum
CARS Coherent Anti-Stokes Raman Spectroscopy
CPA Chirped Pulse Amplification
CFBG Chirped Fiber Bragg Grating
IW Isolator/WDM Hybrid
TW Tap/WDM Hybrid
TIW Tap/Isolator/WDM Hybrid
NPD Non-photon Power Dissipation FIG. 1 illustrates a system 1 according to an embodiment of this invention. The system 1 comprises an optical module 10 for supplying a Stokes light 51, a pump light 52 and a probe light 53 for generating a CARS light 55 on a target (object, sample) 5. The optical module 10 includes a fiber laser module 30 for supplying a first light source (first source pulses, first laser pulses) 31 for converting to the Stokes light 51 and the pump light 52, and a second light source (second source pulses, second laser pulses) 32 for converting to the probe light 53; and an optical plate 20 that includes a plurality of optical elements 29 for converting the first light source 31 to the Stokes light 51 and the pump light 52, and the second light source 32 to the probe light 53. The system 1 may include a scanning module 40 that is configured to scan the target 5 by the Stokes light 51, the pump light 52 and the probe light 53 and acquire the CARS light 55 from the target 5 through a lens 45 and other optical elements; and a detector 43 that is configured to detect the CARS light 55 for analyzing. The system 1 may include a controller (processor) 60 for controlling the entire system 1. The controller 60 may include other functions such as a laser control module 61, an analyzer 62 and others.

The scanning module 40 may be a fingertip scanning interface module, a non-invasive sampler, an invasive sampler, a flow path, or a wearable scanning interface. Each type of scanning interface could be changeable.

FIG. 2 shows one of the wavelength plans of the CARS optical system 1. The Stokes light 51 has the first range R1 of wavelengths 1085-1230 nm (400 cm$^{-1}$~1500 cm$^{-1}$), the pump light 52 has the second range R2 of wavelengths 1040 nm, the probe light 53 has the third range R3 of the wavelengths 780 nm, and TD-CARS light (CARS light, time dependent CARS, time delay CARS) 55 has the range R5 of the wavelengths 680-760 nm. The Stokes light 51 and the pump light 52 may include one to several hundred fS (femto second)-order pulses with tens to hundreds of mW. The probe light 53 may include one to several tens pS (pico second)-order pulses with tens to hundreds of mW. Time-resolved coherent anti-Stokes Raman scattering or Time-delayed coherent anti-Stokes Raman scattering (TD-CARS) microscopy is also known as a technique for suppressing non-resonant background by utilizing the different temporal responses of virtual electronic transitions and Raman transitions. There is a need for a system that can easily apply such measurement methods to various applications.

On the optical plate 20, a plurality of optical elements 29 such as mirrors, prisms, dichroic mirrors, and others are mounted for constructing optical paths. On the optical plate 20, three optical paths (arms) 21-23 may be provided. An optical path (first arm) 21 for supplying the Stokes light 51 with a splitter 21s for splitting a part of the first light source 31 to produce the Stokes light 51 by leading and stretching the part to a Photonic Crystal Fiber (PCF) 21a. An optical path (second arm) 22 supplies the other part of the first light source 31 as the pump light 52. An optical path (third arm) 23 supplies the probe light 53 from the second light source 32 via a SHG 23s and delay module 23a. The optical paths 22 and 23 may include time adjustment units 22d and 23d respectively for fine-tuning the timings of pulses included in the pump light 52 and the probe light 53.

FIG. 3 illustrates one of embodiments of the optical module 10 including the fiber laser module (fiber laser assembly) 30 and the optical plate 20. FIG. 4 illustrates a wavelength plan of the fiber laser module 30. In the fiber laser module 30, the first light source 31 that is centered at 1030 nm and the second light source 32 that is centered at 1560 nm are output from the base laser 35 that is centered at 1560 nm and generated at the oscillator (OSC) 310. The fiber laser module 30 includes: (1) the oscillator (OSC) 310 that is configured to output the base laser 35 with mode-locked to be split for generation of the first light source 31 and the second light source 32; (2) a generator 320 that is configured to generate the first light source 31 by stretching wavelength range of the base laser 35; (3) a first amplifier 330 that includes a first preamplifier 340 and a first Chirped Pulse Amplification (CPA) unit 350 for the first light source 31; (4) a second amplifier 360 that includes a second preamplifier 370 and a second Chirped Pulse Amplification (CPA) unit 380 for the second light source 32; and (5) a LD power distributor 390 that is configured to distribute a laser power from a first laser diode (LD0) 395 to the oscillator 310 as an oscillation source, to the generator 320 as a pump power (*1), to the first preamplifier 340 as a pump power (*2) and to the second preamplifier 370 as a pump power (*3).

The LD power distributor includes a first (Electronically Controlled Variable Optical Attenuator) EVOA 391 to stabilize the laser power supplied to the oscillator 310 and a second EVOA 392 to stabilize the laser power supplied to the generator 320. In this fiber laser module 30, by providing the preamplifiers 340 and 370 for each amplifier 330 and 360 for the source light 31 and 32, and the LD poser distributer 390 distributes the leaser power from the common laser diode LD0 395 to each preamplifier 340 and 370 in addition to the oscillator 310 and the generator 320. This configuration allows, not only reducing the LD quantity, but also the laser diode (common LD) 395 that can be running at its operational level, which may be 90% to 100% of the LD's designed output power level. When a LD 395 operates in this region, the intensity noise from the LD 395 is usually the minimum. Therefore, stable and precisely controlled or tuned base laser 35 can be obtained from the OSC 310, which can then be used to generate stable and precisely controlled or tuned source lights 31 and 32. In this fiber laser module 30, the pulses of the first light source 31 and the pulses of the second light source 32 output from the different amplifiers 330 and 370 are synchronous in time within 50 ps.

In addition, the LD power distributor includes EVOA1 391 for the OSC 310 and EVOA2 392 for the generator 320. In the fiber laser module 30, the OSC 310 is the mother of the light sources 31 and 32, and any fluctuation and noise from the OSC 310 will propagate and even be amplified through the following stages. EVOA1 391 coordinates with the feedback from the PD0, which is the monitor of OSC output (base laser) 35 and forms a laser power control loop to actively stabilize the OSC output power by fine-tuning the EVOA1 391. For the 1 fÊm generation stage 320, it is a supercontinuum generation process and therefore, the output power and spectrum are highly sensitive to the input power.

For the same power control concept, EVOA2 392 is used in the preamplifier to make the input power to HNLF 325 constant.

This fiber laser module 30 provides two fundamental light sources 31 and 32 of the system 1. One is with a wavelength centered at 1032 nm and the other is at 1560 nm. These two outputs 31 and 32 will be the inputs to the optical plate 20 and will be match to the input requirements of the optical plate 20. The 1032 nm output (first light source) 31 provides optical pulses at 12 MHz with a FWHM pulse duration of ~66 ps. The spectral FWHM bandwidth is ~14 nm and the average output power directly from the FC/APC connector connected to a collimator should be in a range from 450 mW to 520 mW. This output will be sent to a free-space grating compressor 71 for the pulse compression. After the compressor 71, the beam will be split into two arms 21 and 22 for CARS Stokes and the CARS pump generation, respectively. The provided power from the 1032 nm fiber laser output 31 is for compensating the loss in the free-space propagation, so the power level can meet the requirement of the inputs in the further stages on the optical plate.

The 1560 nm output (the second source) 32 provides exactly the same pulse repetition rate at 12 MHz as the 1032 nm output 31. The FWHM pulse duration is ~35 ps and the FWHM spectral bandwidth is ~7 nm. The average output power is in a range of 130 mW to 180 mW. This output 32 will be sent to a free-space grating compressor 72 for the pulse compression. After the compressor 72, the beam 32 will be used in SHG 23s via a nonlinear crystal to provide the CARS probe beam 53 at the wavelength of 780 nm. The whole fiber laser module 30 comprises of 4 sub-assemblies (stages): oscillator stage (OSC) 310, 1 fÊm generation stage (generator) 320, 1032 nm CPA stage (the first amplifier) 350, and 1560 nm CPA stage (the second amplifier) 360. The description of each stage will be given in the following subsections.

The fiber laser module 30 includes a FL module that functions as a pump LD and power distribution 390. There are three LDs 395-397 used and the maximum output power at 980 nm they can provide are 600 mW, 850 mW, and 850 mW from LD0 395, LD1 396, and LD2 397, respectively. LD0 395 provides the pump power for the oscillator 310, amplifier for 1 fÊm generation 320, and the preamplification stages 340 and 370 before the CPA stages 350 and 380. First, the output (laser power) from LD0 395 is directly spliced to a 20/80 coupler (FL14). The 20% arm is then spliced to EVOA1 391, which can be controlled electronically. A software loop can work with this component to precisely control the output power from the oscillator 310. The 80% arm from FL14 is then split into a 50/50 ratio with a coupler (FL15). One arm from FL15 goes to EVOA2 392, which is used to control the amplifier output power for the stable 1 fÊm generation in the generator 320. The other 50% arm from FL15 is then split into 50/50 again, each arm is then spliced to the preamplifier pump input in the CPA stages 330 and 360.

FIG. 5 illustrates an arrangement of the OSC 310. This fiber laser OSC 310 is built with an Er-doped active fiber, providing the output wavelengths in the C-band range (1530 nm to 1565 nm), as shown in FIG. 5, and the laser diode, LD0 395 in the distributor 390, working at 976 nm, provides pump power to the oscillator 310 and the preamplifier sub-assemblies in the CPA stages 330 and 360. The output from LD0 395 will be split in 20/80 by a fiber coupler. The 20% arm will link to EVOA1 391 for the fine control of the input pump power to the oscillator 310. The fiber used in this oscillator 310 includes the PM-SMF with anomalous and normal dispersion at C-band wavelengths. This is to manage the cavity dispersion for minimizing the unwanted nonlinear effect inside the cavity. The fiber length is precisely tailored to match the repetition rate in the output specification, which is 12 MHz. The laser output 35 is mode-locked with a SAM 315, giving a FWHM spectral bandwidth of 6 to 8 nm and an average power of 1 to 1.5 mW, depending on the property of SAM 315 and the Er-fiber. 10% of the output 35 is split by a fiber coupler and sent to PD0 for the oscillator power monitoring. This OSC power monitor provides a feedback to the electronic board controlling the applied voltage to EVOA1 391 for a constant output power control of the OSC 310. The remaining 90% will be split in 50/50 and sent to the 1 fÊm generation stage 320 and the 1560 nm CPA stage (the second amplifier) 360, respectively.

In the distributor 390, the 80% arm from the fiber coupler (FL14) with the LD0 395 will be split in 50/50 by another fiber coupler (FL15). One branch goes to the preamplifiers in CPA stages 330 and 360. The other branch connects to EVOA2 392 and goes to the 1 fÊm generation stage 320 as the pump of the EDFA (Er02). Regarding these branches there will be an elaborated description in the later subsections.

The FL module 320 is the 1 fÊm generation stage (generator). The function of this stage 320 is to generate 1 fÊm wavelength from the 1560 nm base laser 35. The purpose is to obtain the exactly the same repetition rate for both 1 fÊm arm and 1.5fÊm arm. The configuration is shown in FIG. 3. This stage 320 takes the output 35 from the oscillator 310 as the stage input. The power amplification is done with an EDFA (Er02) built within this stage 320 and the average output power from the amplifier is ~18 mW. 1% of the power is coupled out and sent to PD1 right at the output of the amplifier for power monitoring. The signal from PD1 becomes the feedback to the board controlling EVOA2 392 so the output power from this EDFA can remain constant. The EDFA output pulse will be compressed directly by a piece of fiber providing negative dispersion. At the splice spot to the HNLF 325, the FWHM pulse duration is compressed down to ~60 fs, corresponding to a peak power of ~25 kW. An optical pulse with this peak power sent into a short piece of HNLF makes the wavelength extend from 1560 nm and eventually covers a range from 1 fÊm to 1.7 fÊm. This is the so-called SC generation process. That is, with this peak power, the pulse propagates in the HNLF 325 with strong nonlinear effects and the spectrum can be broadened from 1560 nm to both short and long wavelengths, eventually forming a supercontinuum spectrum spanning from 1 um to 1.7-1.8 um. This 1 fÊm part is our target which will be harvested for the next stage of amplification 330.

The FL module 330 is the 1032 nm CPA stage (the first amplifier). This stage 330 includes the preamplification, pulse stretch and the final amplification processes. The 50% pump split branch not connected to any EVOA in the distributor 390 is split to 50/50 again here by another fiber coupler (FL16). One arm goes to the preamplifier 340 in this 1032 nm CPA stage 330, and the other goes to the preamplifier 370 of 1560 nm CPA stage 360, which will be introduced later.

As FIG. 3 shows, the generated 1 fÊm will be sent into the port #1 of a 1 fÊm CIR 333. From the port #1 to the port #2 of this CIR 333, only the 1 um part will be selected from the SC spectrum due to the component property. At the port #2, an Yb-fiber (Yb01), a CFBG 335, and a 1030/980 WDM/Tap hybrid component 336 are spliced in sequence. The selected 1 fÊm seed meets the Yb-fiber first and gets amplified. Then the CFBG 335 reflects ~40% power within a wavelength range from 1018 nm to 1053 nm. Wavelengths outside of this range will directly transmit the CFBG 335 and come out from the WDM 336. The output of WDM 336 is used as the monitor of spectrum (to tap2) and power (to PD2) after this preamplifier 340. The reflected part will pass through the Yb-fiber (Yb01) again and have the second amplification before going back into the port #2. The pre-amplified 1 fÊm pulse going into the port #2 comes out from the port #3 of the CIR 333. At this point, the 1 fÊm pulse has been stretched and ready to be amplified in the final amplifier 350.

LD1 396 is an individual laser diode providing the pump power up to 850 mW for 1032 nm final amplifier 350. First the seed from the CIR port #3 will spliced with an isolator/WDM hybrid component 337. This component protects the previous stages from the damages due to the reflected light and the residual pump. An Yb-fiber (Yb02) and a WDM 338 are then spliced in sequence to complete the construction of the 1032 nm CPA stage 330. The final output (first light source) 31 provides optical pulses at 12 MHz with a FWHM pulse duration of ~66 ps. The spectral FWHM bandwidth is ~14 nm and the average output power directly from the FC/APC connector connected to a collimator should be in a range from 450 mW to 520 mW. A 1% Tap is coupled to PD3 and tap3 for the power and spectrum monitoring, respectively. PD3 also provide the feedback to form a control loop for the constant output from the 1032 nm CPA stage 330.

The FL module 360 is the 1560 nm CPA stage. As shown in FIG. 3, this stage 360 also includes the preamplification, pulse stretch and the final amplification processes. The concept is identical to the 1032 nm CPA stage 330 but only a slightly difference in the components due to the operation in different wavelength region. The pump source of the preamplifier 370 is the other half of the split pump from the distributor 390. The seed of 1560 nm is the other half of the split from the 80% of the OSC output 35. The same idea of the 1032 nm CPA stage 330 is applied for the 1560 nm CPA stage 360, but the 1560 nm CPA stage 360 uses 1560 nm CIR 361 port #1 to bring the seed to the preamplification and the pulse stretching processes by using CFBG 363 and WDM 364 components working at 1560 nm. LD2 397 is another individual laser diode providing the pump power up to 850 mW for 1560 nm final amplifier 380. From the port #3 of CIR 361, the pre-amplified seed is sent to the Er-fiber (Er04) and a Tap/Isolator/WDM hybrid component 365 to complete the 1560 nm CPA stage 360.

The final output provides optical pulses at 12 MHz as the 1560 nm output 32. The FWHM pulse duration is ~35 ps and the FWHM spectral bandwidth is ~7 nm. The average output power is in a range of 130 mW to 180 mW. A 1% Tap is coupled to PD4 and tap4 for the power and spectrum monitoring, respectively. PD4 also provides the feedback to form a control loop for the constant output from the 1560 nm CPA stage 360.

Figure 7:
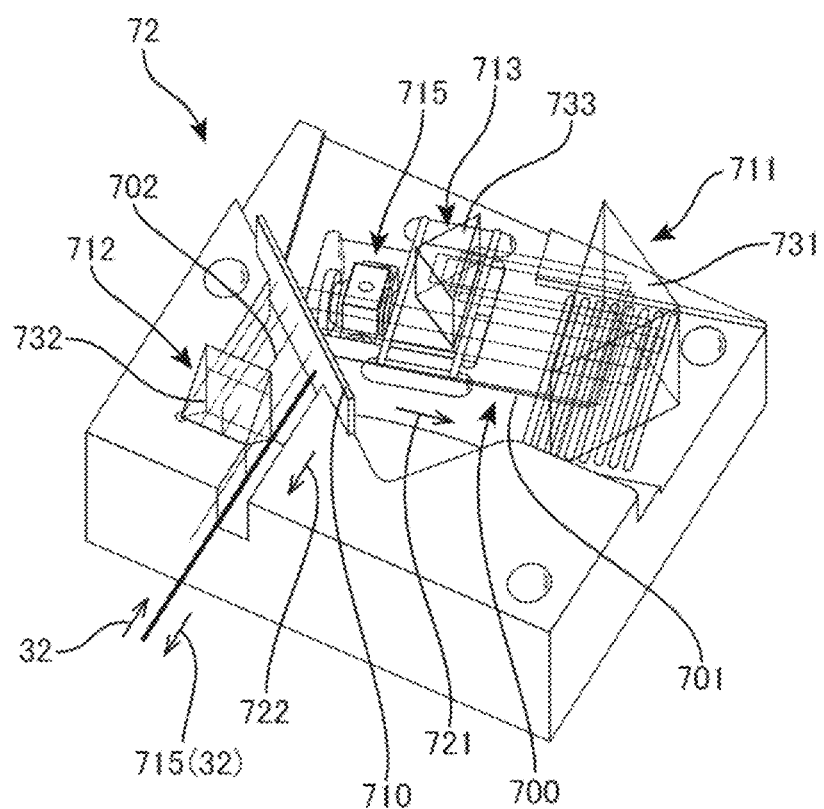
FIG. 7 depicts a perspective view of the compressor.

FIGS. 6 and 7 illustrate the compressor (1560 nm pulse compressor) 72. A part of the Chirp Pulse Amplification scheme provided by the fiber laser module 30, the compressors 71 and 72 are provided on the optical plate 20 for reversing the stretching of the pulses of the first light source 31 and the second light source 32 respectively before supplying to the respective arms 21, 22, and 23. Generally, the compressor is changing the pulse duration. It is compressing the incoming laser pulse duration to shortest achievable duration. That is, in Chirp Pulse Amplification (CPA) scheme used in ultrafast systems, short laser pulses are first stretched, then amplified, and finally compressed back to short pulse duration. Higher amplification requires larger stretching of the pulse in order to avoid damage and nonlinear effects distorting the pulses temporal envelope. As stretching can be achieved in fibers this leaves the problem of compression. Traditional compressor consists of two parallel gratings, where spacing of the gratings is proportional to compression factors.

The compressor 72 shown in FIGS. 6 and 7 compresses a stretched light source (1560 nm pulses) 32 supplied by the fiber laser module 30. The compressor 72 includes: a grating 710; and a first optical element 711 and a second optical element 712 for folding an optical path 700 on both sides 721 and 722 of the grating 710 respectively. The second optical element 712 is arranged to fold the light in a direction orthogonal to the first optical element 711. The compressor 72 may further include a third optical element 713 for folding the optical path 700 on the side 721 of the first optical element 711. In the compressor 72, typical optical elements for folding the optical path 700 are prisms, hence, the first optical element 711 may include a first prism 731, and the second optical element 712 may include a second prism 732 arranged to fold the light in a direction orthogonal to the first prism 731. The third optical element 713 may include a third prism 733 arranged to fold the light in a direction parallel to the first prism 731. The compressor 72 may include a position adjustment device 715 for adjusting the position of the third optical element 713 to control the optical path length for compressing in detail.

In the compressor 72, a beam, in this case the second light source 32, enters the compressor 72 and its spectral components are diffracted by the grating 710. The optical path 700 is dependent on the wavelength, so the spectral phase is changed in a way that the pulse duration is extended by 3 orders of magnitude. The compression 72 is a function of the grating separation. Folded design prisms 731, 732 and 733 are used to retro-reflect the spectrum on the same grating 710. The prism 733 is placed on the linear stage (position adjustment device) 715 and provides a convenient method of changing the effective grating separation without affecting the grating parallelism.

In the case of this 1560 nm compressor 72, the distance between the first and second incidence is ~200 mm, so in order to keep the footprint compact, the second prism 732 is added for second folding. After the second incidence on the grating 710, the beam 702 enters the second prism 732 that retro-reflects the beam 702 with changed height because the second prism 732 arranged to fold the light in a direction orthogonal (perpendicular) to the first prism 731. Next, the beam 702 retraces its path back. On the 4th incidence to the grating 710, the spectrum is recombined to an output beam 715 that is used as the second light source 32 in the third arm 23 for generating the probe light 53.

As explained, to minimize the footprint, a folded design with one grating is used in the compressor 72. In the compressor 72, the beam 701 diffracted by the grating 710 is folded by the first prism 731 and the third prism 733, and reentered to the grating 710. The beam 702 diffracted by the grating 710 again is going further and folded by the second prism 732 and reentered to the grating 710. The compressor 72 folds the light path 700 twice and achieves much smaller footprint than even single fold scheme. The double folded compressor 72 that is occupying twice smaller footprint than that of an equivalent structure with single fold. The same structure may be applied to the compressor 71.

In the third optical path (third arm) 23 included in the optical plate 20, a PPLN 23s is applied as a SHG for the probe pulse shape control. In the system 1, the probe pulses supplied as the probe light 53 have two conflicting requirements. That is, the probe pulses having narrow bandwidth are required for higher spectral resolution of the system 1, and the probe pulses having sharp edge are required for a temporal resolution of the system 1 when using time delay to suppress resonant CARS signal 55. Comparing with simple doubling crystal, by using PPLN (Periodically poled lithium niobate) 23s, higher efficiency conversion and larger bandwidth can be achieved. At the same time, using periodic structure of the PPLN results in constructive interference that generates probe edge much steeper than equivalent gaussian pulse with same bandwidth as shown in FIGS. 8 and 9.

As explained above, a hybrid fiber/free space laser architecture for TD-CARS is disclosed. The femtosecond fiber laser system has two main outputs. One output delivers a 12 MHz light source centered at 1560 nm with a bandwidth around 6 nm. This spectral condition allows a compressed pulse duration down to ~580 fs. The peak power can reach up to ~17 kW with the maximum average power of 120 mW. The other output has the exact same repetition rate and wavelength centered at 1030 nm with a bandwidth of 14 nm. The pulse duration after compression can be ~120 fs. With the maximum average output power of 450 mW, the peak power can reach up to ~230 kW. At the output collimators, these two pulses from different output arms are synchronous in time within 50 ps.

In this specification, a full fiber solution for high performance CARS is also disclosed. This picosecond fiber laser system has one output containing time-overlapped 1 um and 1.3 um pulses. The system starts with a laser oscillator providing 1 um output wavelength with a narrow bandwidth of ~0.3 nm. The seed is split into two arms for the amplification stages. In one of the arms, the amplified 1 um is directly spliced to a piece of photonic crystal fiber for the supercontinuum generation to provide the wavelength range to 1.3 um. With a special design, a 100 nm bandwidth around 1.3 um is selectable with an average power level up to 100 mW. The 1.3 um arm is then recombined with the 1 um arm for the final single output. The final output contains average power up to Watt-level at 1 um and 100 mW at 1.3 um. The pulse duration of the output is less than 20 ps. With various designs, the two pulses can be partially time-overlapping or fully time-overlapping.

In this specification, a compact Optical compressor is also disclosed. In Chirp Pulse Amplification (CPA) scheme used in ultrafast systems, short laser pulses are first stretched, then amplified, and finally compressed back to short pulse duration. Higher amplification requires larger stretching of the pulse in order to avoid damage and nonlinear effects distorting the pulses temporal envelope. As stretching can be achieved in fibers, this leaves the problem of compression. A traditional compressor consists of two parallel gratings where spacing of the gratings is proportional to compression factors. In order to minimize the footprint, a folded design with one grating is used. We proposed going further and fold the compressor twice and achieve much smaller footprint then even single fold scheme. Below is an assembly that shows a double folded compressor that is occupying twice smaller footprint than that of an equivalent structure with single fold.

In this specification, a probe pulse shape control is also disclosed. Our probe pulses have 2 conflicting requirements: narrow bandwidth resulting in higher spectral resolution of the system; and sharp edge of the pulse allowing for a temporal resolution of the system when using time delay to suppress resonant CARS signal. Starting with simple doubling crystal would result with lower efficiency conversion and bandwidth much larger than can be achieved while using Periodically poled lithium niobate (PPLN). At the same time using periodic structure of the PPLN results in constructive interference that generates probe edge much steeper than equivalent gaussian pulse with same bandwidth.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

The invention claimed is:

1. A system comprising an optical module for supplying a Stokes light, a pump light and a probe light for generating a CARS light,
    wherein the optical module includes:
        a fiber laser module for suppling a first light source for converting to the Stokes light and the pump light, and a second light source for converting to the probe light; and
    the fiber laser module includes:
        an oscillator that is configured to output a base laser with mode-locked to be split for generation of the first light source and the second light source;
        a generator that is configured to generate the first light source by stretching wavelength range of the base laser with power amplification using a first pump power supplied by a laser diode (LD);
        a first amplifier that includes a first preamplifier and a first Chirped Pulse Amplifier for the first light source, the first preamplifier using a second pump power supplied by a LD and the first Chirped Pulse Amplifier using a third pump power supplied by a LD;
        a second amplifier that includes a second preamplifier and a second Chirped Pulse Amplifier for the second light source, the second preamplifier using a fourth pump power supplied by a LD and the first Chirped Pulse Amplifier using a fifth pump power supplied by a LD.

2. The system according to claim 1, wherein the optical module further includes a LD power distributor including a plurality of LDs for suppling the first to fifth pump powers, and at least one of the first to fifth pump powers is supplied by splitting at least one of the plurality of LDs.

3. The system according to claim 1, wherein
    the optical module further includes
        an optical plate that includes a plurality of optical elements for converting the first light source to the Stokes light and the pump light, and the second light source to the probe light, and
    the plurality of optical elements of the optical plate includes a compressor for compressing a stretched light source supplied by the fiber laser module, and
    the compressor includes:
        a grating; and a first optical element and a second optical element for folding an optical path on both sides of the grating respectively.

4. The system according to claim 3, wherein the second optical element is arranged to fold light in a direction orthogonal to the first optical element.

5. The system according to claim 3, wherein the first optical element includes a first prism, and the second optical element includes a second prism arranged to fold light in a direction orthogonal to the first prism.

6. The system according to claim 3, wherein the compressor further includes a third optical element for folding the optical path on the side of the first optical element.

7. The system according to claim 3, wherein the plurality of optical elements of the optical plate includes a Second Harmonic Generation (SHG) for generating the probe light from the second source light,
the SHG includes a Periodically Poled Lithium Niobate (PPLN) compressor for compressing a stretched light source supplied by the fiber laser module.

8. The system according to claim 3, wherein the plurality of optical elements of the optical plate includes a splitter for splitting a part of the first light source to produce the Stokes light by leading and stretching the part to a Photonic Crystal Fiber (PCF), and splitting other parts of the first light source as the pump light.

9. The system according to claim 1, further comprising:
a scanning module that is configured to scan a target by the Stokes light, the pump light and the probe light and acquire the CARS light from the target; and
a detector that is configured to detect the CARS light for analyzing.

10. The system according to claim 1, wherein the first light source is centered at 1030 nm, the second light source is centered at 1560 nm, and the base laser is centered at 1560 nm.

* * * * *